(No Model.)

L. J. BERGENDAHL.
COMBINED ROTARY PLOW AND HARROW.

No. 417,466. Patented Dec. 17, 1889.

Witnesses
L. S. Elliott
E. W. Johnson

Lewis J. Bergendahl.
Inventor

By his Attorneys

UNITED STATES PATENT OFFICE.

LEWIS JOHN BERGENDAHL, OF PENDLETON, OREGON.

COMBINED ROTARY PLOW AND HARROW.

SPECIFICATION forming part of Letters Patent No. 417,466, dated December 17, 1889.

Application filed December 14, 1888. Serial No. 293,647. (No model.)

*To all whom it may concern:*

Be it known that I, LEWIS JOHN BERGENDAHL, a naturalized citizen of the United States, residing at Pendleton, in the county of Umatilla and State of Oregon, have invented certain new and useful Improvements in Combined Rotary Plow and Harrow; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has reference to combined plows and harrows; and it consists in the improved construction hereinafter described and set forth, whereby a simple and efficient arrangement is provided that will properly and readily perform all the functions incident to this class of machines generally.

Figure 1:
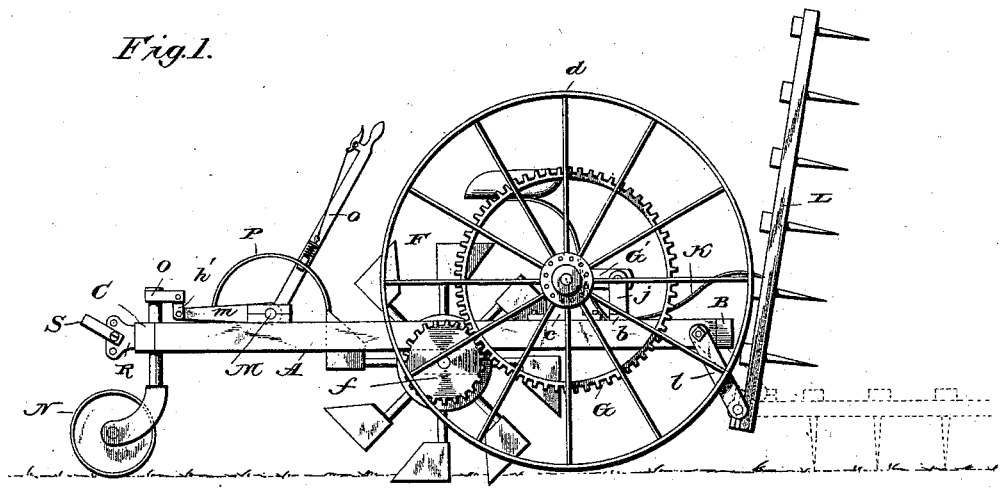
Figure 2:
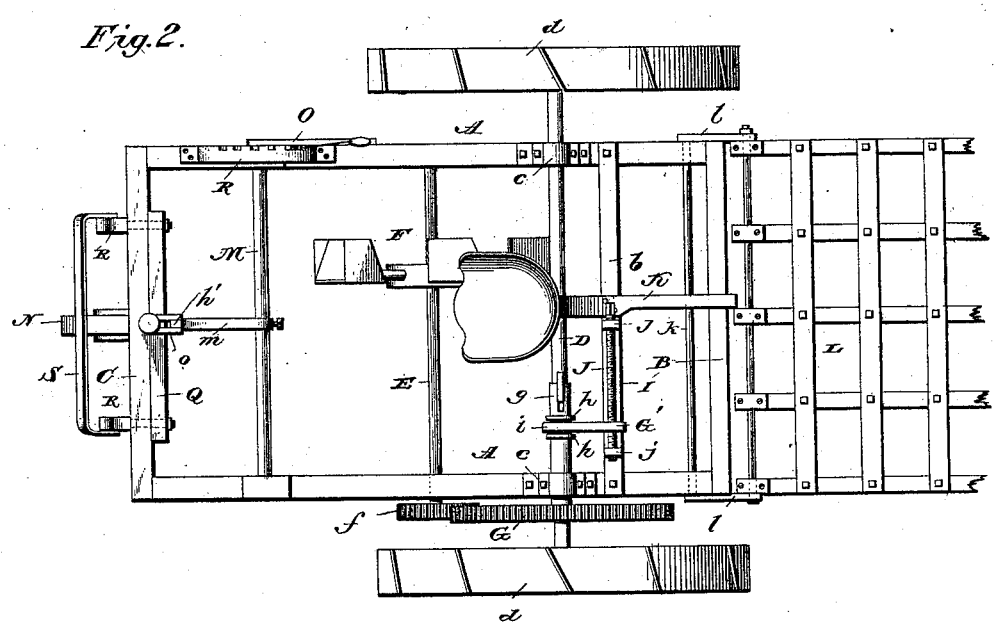

In the accompanying drawings, forming part of this specification, Figure 1 is a side view of a machine embodying my improvements, the harrow portion being represented in an operative and an inoperative position by full and dotted lines. Fig. 2 is a plan view.

The main frame of the machine consists of side bars A A, rear bar B, and front bar C, all of which may be presented by a single piece or several sections bolted together, as may be found desirable. Transverse brace $b$ serves to strengthen the frame at the front and rear. Adjacent to the rear brace $b$, but slightly in advance of the same, on the side bars are located bearing-boxes $c$, in which bears a main carrying-axle D, upon the end of which the supporting-wheels $d$ are mounted. On the under side of the side bars are located bearing-boxes for the reception of a transverse shaft E, which has keyed thereon, between the sides of the frame, a rotary plow F, consisting of a central hub, from which radiate a series of arms carrying shovels or cultivators at their outer portions. One of the projecting ends of said shaft E carries a gear-pinion $f$. The main axle D has a spline or feather at one side, and is embraced at this point by a sleeve $g$, which plays through the bearing-box and carries at its outer portion a large gear-wheel G, while its inner part carries two annular shoulders $h$, between which the bifurcated end $i$ of an arm G' embraces the sleeve, the other end of said arm being provided with a threaded perforation for the passage of the transversely-located threaded shaft I, the ends of which turn in the ears $j$ of a bracket J, secured on the brace $b$; also, on said brace $b$ is secured the central portion of a U-shaped spring member K, the front extremity of which is bent horizontally for the attachment of a seat, while the rear end is hook-shaped, for a purpose to be presently explained. A transverse rod $k$ is seated in the side bars of the frame adjacent to the rear bar, and its projecting ends have pivotally attached thereto links $l$, the other ends of which are pivotally connected to a transverse rod located in the forward portion of a harrow L. This arrangement is such that the harrow can occupy the position shown in dotted lines, Fig. 1, for service or be elevated on its pivotal link-connections, so that the hook of the rear spring member can engage one of the cross-bars of the harrow-frame and maintain it out of operative position, as shown by full lines in said figure.

Bearing-boxes located at each side near the front of the main frame support a shaft M, centrally upon which is keyed a forwardly-extending arm $m$, the front end of which carries a short link $h'$, the upper tongue of which is pivotally secured between the rear parallel ends of the horizontal yoke-clip $o$. This latter embraces the vertical shank of a caster-wheel N, the upper end of which is enlarged to bear upon the upper face of the clip. One end of the shaft M projects beyond the side of the frame, where it has rigidly secured to it a hand-lever O, adapted to engage and become locked by one of a series of teeth carried by a ratchet-segment P.

The front bar of the main frame and a supplemental bar Q, bearing thereagainst on its rear side, are both recessed to conjointly form a vertical circular perforation, in which the shank of the caster-wheel bears. The supplemental bar Q is secured to the front bar in the threaded shanks of castings R, said shanks being engaged by nuts on the rear. The forward part of each casting R consists of a vertical segmental plate having a series of perforations. A transverse clevis-bar S has its ends bent at an angle and perforated to register with the perforations in the castings and be secured thereto by means of bolts. Of course by shifting the bolt-connections the relative height of the clevis may be varied.

As will be readily understood, the movement of the lever will occasion the caster, through the link and arm connections, to be raised or depressed relative to the frame, and thus vary the depth at which the rotary plow cuts. By having one of the ends of the threaded shaft made square the application of a wrench will enable the same to be readily turned, so that the gear-wheel can be moved into and out of engagement with the gear-pinion, and resulting in the suspension or renewal of the rotation of the plow. The peripheries of the carrying-wheels are roughened to increase the traction of the same.

I claim—

1. The combination of the main frame, shaft journaled therein and carrying rotary plow and gear pinion, an axle carrying supporting-wheels, sleeve moving therein and therewith and carrying gear-wheel, and bifurcated arm engaging sleeve, and threaded shaft-operating arm, substantially as set forth.

2. The combination of the main frame, the axle and supporting-wheels of the harrow pivotally connected at the rear of the main frame, a spring member K, bolted to the latter, as described, and curved to form a hook for suspending the harrow when elevated, substantially as set forth.

In testimony whereof I affix my signature in presence of two witnesses.

LEWIS JOHN BERGENDAHL.

Witnesses:
THOS. FITZ GERALD,
D. W. BAILEY.